US012617471B2

(12) United States Patent
Ross et al.

(10) Patent No.: US 12,617,471 B2
(45) Date of Patent: May 5, 2026

(54) FRONT-END STRUCTURE FOR A MOTOR VEHICLE WITH ELECTRIC FRONT-WHEEL DRIVE

(71) Applicant: Ford Global Technologies, LLC, Dearborn, MI (US)

(72) Inventors: Brian Douglas Ross, Marine City, MI (US); Marius Sawatzki, Pulheim (DE); Daniel Meckenstock, Wuppertal (DE); Matt Dunker, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 571 days.

(21) Appl. No.: 18/162,902

(22) Filed: Feb. 1, 2023

(65) Prior Publication Data

US 2023/0249755 A1     Aug. 10, 2023

(30) Foreign Application Priority Data

Feb. 8, 2022     (DE) .......................... 102022102840.2

(51) Int. Cl.
*B62D 25/08*          (2006.01)
(52) U.S. Cl.
CPC .................................. *B62D 25/085* (2013.01)
(58) Field of Classification Search
CPC .... B62D 25/082; B62D 25/085; B62D 21/11; B62D 21/152; B62D 21/155; B60K 1/00
USPC ........... 296/193.09, 187.09, 187.01, 203.02; 180/291, 299
See application file for complete search history.

(56) References Cited

U.S. PATENT DOCUMENTS

| | | | |
|---|---|---|---|
| 7,380,830 B2 * | 6/2008 | Mitsui | B62D 25/16 |
| | | | 180/311 |
| 10,562,386 B2 | 2/2020 | Spurling | |
| 10,926,801 B2 * | 2/2021 | Stainer | B62D 25/085 |

(Continued)

FOREIGN PATENT DOCUMENTS

| | | |
|---|---|---|
| CN | 111746656 | 10/2020 |
| DE | 102016009395 | 2/2018 |

(Continued)

OTHER PUBLICATIONS

Epple et al. (EP 2069187 B1), machine translation (Year: 2012).*
Office Action issued in corresponding German Application No. 102022102840.2, issued Nov. 17, 2022, 8 pages.

*Primary Examiner* — Amy R Weisberg
*Assistant Examiner* — Wenwei Zhuo
(74) *Attorney, Agent, or Firm* — Burris Law, PLLC

(57) ABSTRACT

A front-end structure for a motor vehicle with electric front-wheel drive. The front-end structure includes at least two longitudinal members, at least one support unit, and at least one electric traction motor. The longitudinal members extending in a vehicle longitudinal direction and arranged at a lateral distance from each other. The support unit is fastened to the longitudinal members. The electric traction motor is fastened to a front-side crossmember that extends in a vehicle transverse direction and is fastened to the longitudinal members. The electric traction motor has at least one rear-side fastening section, which the electric traction motor is fastened to the support unit at the rear. The support unit has at least one section arranged to be offset relative to the rear-side fastening section.

20 Claims, 5 Drawing Sheets

(56)     References Cited

U.S. PATENT DOCUMENTS

| | | | | |
|---|---|---|---|---|
| 12,090,935 | B2 * | 9/2024 | Hoshika | .................. B60K 1/00 |
| 2019/0210652 | A1 * | 7/2019 | Sawatzki | ............... B60T 7/065 |
| 2019/0344650 | A1 | 11/2019 | Suumen et al. | |
| 2023/0182820 | A1 * | 6/2023 | Park | ...................... B62D 27/02 |
| | | | | 180/68.5 |
| 2025/0050721 | A1 * | 2/2025 | Sykes | ................. B62D 27/023 |

FOREIGN PATENT DOCUMENTS

| | | | | |
|---|---|---|---|---|
| DE | 102021208212 | | 3/2022 | |
| DE | 102021101730 | | 7/2022 | |
| EP | 2069187 | B1 * | 2/2012 | .......... B62D 29/001 |
| JP | 2020157987 | | 10/2020 | |
| JP | 2020157987 | A * | 10/2020 | ............. B62D 21/09 |

* cited by examiner

FRONT-END STRUCTURE FOR A MOTOR VEHICLE WITH ELECTRIC FRONT-WHEEL DRIVE

CROSS-REFERENCE TO RELATED APPLICATION

This application claims priority to and the benefit of German Patent Application No. 102022102840.2, filed on Feb. 8, 2022. The disclosure of the above application is incorporated herein by reference.

FIELD

The present disclosure relates to a front-end structure for a motor vehicle with electric front-wheel drive.

BACKGROUND

The statements in this section merely provide background information related to the present disclosure and may not constitute prior art.

As compared with conventional motor vehicles with an internal combustion engine, electric cars have a new drive architecture. In addition, future electric traction motors will have a different motor geometry from electric traction motors currently used. Such a new motor geometry can in particular permit a displacement of a center of gravity of an electric traction motor, which requires a new motor suspension, which is primarily determined by the center of gravity of the electric traction motor, since it is advantageous to arrange for an imaginary connecting plane between suspension points for the electric traction motor to extend through the center of gravity of the electric traction motor.

In particular in an electric traction motor which is able to apply a high torque to the drive axle, for example beginning at 6000 Nm axle torque, it is advantageous to use longer lever arms, which each carry a motor mounting, about a y axis (transverse axis) of the electric traction motor through the motor center of gravity. For example, via the lever arms, the motor mountings can each be arranged at a distance of about 350 millimeters (mm) to 700 millimeters (mm) from the motor center of gravity. The motor torque that can be generated by the electric traction motor does not correspond to the axle torque if the motor torque is transferred to the axle via a transmission.

Conventionally, an electric traction motor is fastened to a respective crossmember at the front and rear, wherein the crossmembers are fastened to longitudinal members of a front-end structure. The rear-side motor suspension is located at a height of a lower crossmember for an instrument panel. Here, the rear-side motor suspension additionally defines the largest dimension of the electric traction motor in the vehicle longitudinal direction. A support unit is fastened to the rear-side crossmember or the support unit is integrated in the rear-side crossmember which, in a plan view from above, is predominantly arranged between frame longitudinal members of the front-end structure and carries electronic components of an electric front-wheel drive and/or further vehicle components.

In the event of a certain type of frontal impact on such a front-end structure, the upper rear-side crossmember may move in the direction of the instrument panel and, as a result, may cause deformations in the instrument panel, while at the same time the vehicle impulse index (VPI, retardation index) may increase, which may lower occupant protection performance. This goes hand-in-hand with a need for structural shortening of the front section of a motor vehicle because of design intentions and for a displacement of the instrument panel in the direction of the front in order to create more space for the occupants.

CN 111746656 A discloses a front-end structure for a motor vehicle which is set up to protect auxiliary components of an engine and to absorb impact energy during certain type of frontal collision. The front-end structure has a subframe which extends in the vehicle longitudinal direction, an engine which is carried by the sub-frame, an auxiliary machine component which is provided on a rear side of the engine, a front-side crossmember, to which a rear end of the subframe is fastened, and an instrument panel. A first deformable part is formed in the subframe between a carrier part and a rear-side end part of the engine. A second deformable part is formed on the instrument panel. A guard which is carried by the auxiliary frame is arranged between the auxiliary machine component and the second deformable part.

U.S. Pat. No. 10,562,386 B2 discloses an arrangement for a motor vehicle, having an engine assembly and a first engine catch hook which is coupled to the engine assembly, wherein the first engine catch hook has a hook section which is designed to engage in a subframe of the motor vehicle during a certain type of collision and to transmit a load from the engine assembly to the subframe. In addition, the arrangement has a second engine catch hook which is coupled to the engine assembly, wherein the second engine catch hook has a hook section which is spaced apart vertically from the hook section of the first engine catch hook and is designed to engage in a catch structure during the certain type of collision and to transmit a load from the engine into the catch structure, wherein the catch structure is an upper end of a bulkhead structure between an engine compartment and an interior of the vehicle.

U.S. Pat. No. 10,926,801 B2 discloses a road vehicle which has a drive train, a bulkhead which separates a front compartment of the vehicle, in which the drive train is fastened, from a passenger compartment of the vehicle, and has a drive train catch device which comprises a drive train catcher and a transverse structural element which is part of the vehicle and is positioned at the rear with respect to the drive train catcher. The drive train catcher is arranged between the drive train and the transverse structural element and has a rigid arm section which extends away from a structural part of the drive train, and a striker bar section, which extends rearward away from the arm section toward the transverse structural element. The impact section has an impact surface which, in normal use, is spaced apart from an intentionally weakened region of the transverse structural element and which, in the event of a rearward displacement of the drive train, strikes the intentionally weakened region of the transverse structural element, which has the effect that the impact section is accordingly forced through the intentionally weakened region of the transverse structural element in order to form a recess, in which the impact section will engage.

SUMMARY

This section provides a general summary of the disclosure and is not a comprehensive disclosure of its full scope or all of its features.

The present disclosure provides a front-end structure for a motor vehicle with electric front-wheel drive. The front end structure includes at least two longitudinal members, at least one support unit, and at least one electric traction motor. The at least two longitudinal members extend in a vehicle longitudinal direction and are arranged at a lateral distance from each other. The at least one support unit is fastened to the at least two longitudinal members. The at least one electric traction motor is fastened at the front to a front-side crossmember that extends in a vehicle transverse direction and is fastened to the at least two longitudinal members. The at least one electric traction motor has at least one rear-side fastening section, via which the at least one electric traction motor is fastened to the at least one support unit at the rear. the at least one support unit has at least one catching section arranged to be offset relative to the fastening section at the rear.

It should be understood that the features and measures listed individually in the following description can be combined with one another in any desired technically expedient way and indicate further refinements of the disclosure. The description additionally characterizes and specifies the disclosure, in particular in conjunction with the figures.

According to the present disclosure, the rear-side fastening section of the electric traction motor is fastened directly to the support unit. Furthermore, the support unit is fastened to the longitudinal members, for example via screw connections. In the event of a certain type of front impact, under the assumption that the support unit is not detached from the longitudinal members, in order to protect electronic components possibly carried by the support unit, the electric traction motor and its rear-side fastening section can detach from the support unit, as a result of which the electric traction motor can move relative to the support unit, in particular in the vehicle longitudinal direction. However, this ability of the electric traction motor to move relative to the support unit is limited by the catching section of the support unit, since the rear-side fastening section of the electric traction motor contacts the inside of the catching section and, as a result, is caught and trapped by the latter. In the process, the support unit is displaced in the vehicle longitudinal direction only in the event of plastic deformation of the longitudinal members, wherein this displacement is thus determined by the rigidity of the longitudinal members and the forces being applied. The extent of this displacement can therefore be adjusted or reduced by a specific shape of the longitudinal members, in particular by a specific choice of the support material, the support wall thickness or the like or the entire front-end structure.

The rear-side fastening point can be arranged to be higher as compared with a conventional fastening of an electric traction motor to a rear-side crossmember. In the event of a certain type of front impact, the load paths extend through the electric traction motor or its rear-side fastening section detached from the support unit, from there through the support unit and/or its catching section and from there into the longitudinal members. Even if, in this case, the support unit were to come into contact with an instrument panel or a bulkhead arranged at the rear thereof, the load level in the instrument panel may be lower than in the case in which the fastening section at the rear would contact the instrument panel or the bulkhead unimpededly. Consequently, displacement of the electric traction motor in the direction of the passenger compartment of the motor vehicle may be reduced. Naturally, this effect can be increased if the support unit or its catching section does not contact the instrument panel or the bulkhead at all during a certain type of front impact. This can be achieved by the support unit being designed and connected to the longitudinal members in such a way that, in the event of a certain type of front impact, the support unit is not deformed plastically but is merely displaced by the plastic deformation of the longitudinal members.

The position of the support unit can be determined by a planned geometry/architecture of the electric traction motor and a desired installation space for the engine mountings that results therefrom. As a result, an engine mounting position and the height of the support unit can be predefined by external factors. If the support unit is located at the height of the bulkhead, in particular completely or partly in front of the bulkhead in the vertical direction, the limitation according to the disclosure of the motor mounting displacement may reduce the indentations on the bulkhead. If the support unit is arranged lower down than the bulkhead, a controlled breakage of the engine mountings or a limitation of the engine mounting displacement may be used for VPI enhancement. In the case of battery electric vehicles, other modules are located in the travel path of the electric traction motor toward the rear, such as, for example, a battery to be protected. The limitation of the travel path of the electric traction motor after motor mounting breakage therefore offers a controlled enlargement of the free deformation length of the front end or the front-end structure.

Thus, in the event of a certain type of front impact, the disclosure provides the catching of the rear-side fastening section of the electric traction motor that is detached from the support unit, wherein slippage of the rear-side fastening section is inhibited by the catching section, in particular by the shape of the catching section of the support unit. As a result, the VPI value of the front-end structure and of a correspondingly equipped motor vehicle may enhance. The manner in which the rear-side fastening section of the electric traction motor is detached from the support unit and/or can move relative to the support unit can be different here, depending on the requirements.

No additional components, which would disadvantageously increase the weight of the motor vehicle, are needed to implement the disclosure. In addition, no additional catching features on the electric traction motor are needed for the implementation. Furthermore, no additional structural part for attaching the electric traction motor is needed, since the support unit is used for this attachment.

The electric traction motor is an electric motor which, in addition, has at least one front-side fastening section, via which the electric traction motor is fastened at the front to the front-side crossmember connecting the two longitudinal members to each other. At the rear, the electric traction motor is connected only to the support unit, that is to say not to another component of the front-end structure. The electric traction motor can also have two rear-side fastening sections and/or front-side fastening sections arranged at a distance from each other in the vehicle transverse direction.

The support unit can additionally be used to carry relatively large electronic components of the electric front-wheel drive, for example an AC/DC converter or the like. The catching section may optionally be formed integrally on the support unit. The catching section may optionally be arranged at a distance offset on the rear side relative to the rear-side fastening section of the electric traction motor. When this rear-side fastening point moves toward the rear and upward (movement in the +x direction and +z direction) during a certain type of front impact, the rear-side fastening section is caught by the catching section during a certain type of front impact. The catching section can be formed in any desired way, in particular in order to be able to inhibit the slippage of the rear-side fastening section on the catching section in the event of load-induced movements of the electric traction motor. For example, the catching section can be provided in the form of a vertical wall, in particular considering load-relieving angles. The electronic components of the electric front-wheel drive can, for example, be fastened to the supporting surface of the support unit.

The front-end structure can be used for a motor vehicle in the form of an electric vehicle. Thus, such a motor vehicle is likewise a subject of the present disclosure.

According to another configuration, the support unit is formed by a rear-side crossmember. Here, the catching section is therefore formed on the crossmember. The rear-side crossmember and/or the front-side crossmember can be a motor crossmember or a chassis crossmember.

According to yet another configuration, the support unit forms a rear-side crossmember and at least one support element which is arranged on the crossmember and has a supporting surface for supporting at least one electronic component of the front-wheel drive. Here, the catching section is formed on the support element. The vertical distance between the supporting surface and the lower free end of the catching section can be larger than the vertical distance between the supporting surface and the fastening point at which the fastening section is fastened to the support unit.

According to one configuration, a width of the catching section provided in the vehicle transverse direction is smaller than a width of the supporting surface provided in the vehicle transverse direction. In this way, material and thus weight can be saved during the manufacture of the catching section and the support unit.

According to another configuration, the crossmember and the support element are connected monolithically to each other.

According to yet another configuration, a lower free end section of the catching section is angled over in the direction of the electric traction motor. As a result, the catching section is L-shaped or hook-shaped in cross section. As a result, the catching section can catch the rear-side fastening section of the electric traction motor, even if the electric traction motor were to move downward (movement in the +x direction and −z direction).

According to one configuration, at least one vertical reinforcing rib is arranged on an outer side of the catching section, facing away from the electric traction motor. Two or more vertical reinforcing ribs can also be arranged on the outer side of the catching section. The vertical reinforcing ribs can be shaped individually as desired in order to exhibit increased strength or stiffness as required by the load cases.

According to another configuration, at least one horizontal reinforcing rib is arranged on the outer side of the catching section, facing away from the electric traction motor. As a result, moments also acting in the vehicle transverse direction can be absorbed by the support unit in the region of the horizontal reinforcing rib. Two or more horizontal reinforcing ribs can also be arranged on the outer side of the catching section.

According to yet another configuration, the electric traction motor has two rear-side fastening sections arranged at a distance from each other in the vehicle transverse direction, wherein an individual catching section for each fastening section is arranged on the support unit. Thus, an individual catching section is arranged to be offset on the rear side in relation to each rear-side fastening section of the electric traction motor. The respective catching section may be strengthened or stiffened by one or more reinforcing ribs.

According to another form, the present disclosure provides a front-end structure for a motor vehicle with electric front-wheel drive. The front-end structure includes a pair of longitudinal members, a support unit, a front-side crossmember, and an electric traction motor. The pair of longitudinal members extend in a vehicle longitudinal direction and are arranged at a lateral distance from each other. The support unit is secured to the pair of longitudinal members and has a supporting surface. The front-side crossmember extends in a vehicle transverse direction and is secured to the pair of longitudinal members. The electric traction motor is secured to the front-side crossmember and has a rear-side fastening section secured to a rear end of the support unit at a fastening point. The support unit has a first catching section offset in a rearward direction relative to the rear-side fastening section and extending downward past the fastening point.

In variations of the front-end structure of the above paragraph, which may be implemented individually or an any combination: a first vertical distance between the supporting surface and a lower free end of the first catching section is greater than a second vertical distance between the supporting surface and the fastening point; a lower free end of the first catching section is angled over and extends toward the electric traction motor; the first catching section has a first width extending in the vehicle transverse direction and the supporting surface has a second width extending in the vehicle transverse direction, the first width is smaller than the second width; a plurality of vertical reinforcing ribs are located at an outer side of the first catching section that faces away from the electric traction motor, the vertical reinforcing ribs are spaced apart from each other in the vehicle transverse direction; the vertical reinforcing ribs are located below the supporting surface; at least one first vertical reinforcing rib is located on an outer side of the first catching section that faces away from the electric traction motor; the electric traction motor has a second rear-side fastening section that is spaced apart from the first rear-side fastening section in the vehicle transverse direction; a second vertical reinforcing rib is located on an outer side of the first catching section that faces away from the electric traction motor; at least one first vertical reinforcing rib includes a plurality of vertical reinforcing ribs located at an outer side of the first catching section that faces away from the electric traction motor; and a plurality of second vertical reinforcing ribs are located at an outer side of the second catching section that faces away from the electric traction motor.

According to another form, the present disclosure provides a front-end structure for a motor vehicle with electric front-wheel drive. The front-end structure includes a pair of longitudinal members, a support unit, a front-side crossmember, and an electric traction motor. The pair of longitudinal members extend in a vehicle longitudinal direction and are arranged at a lateral distance from each other. The support unit is secured to the pair of longitudinal members and has a supporting surface. The front-side crossmember extends in a vehicle transverse direction and is secured to the pair of longitudinal members. The electric traction motor is secured to the front-side crossmember and has a rear-side fastening section secured to a rear end of the support unit at a fastening point. The support unit has first and second catching sections offset in a rearward direction relative to the rear-side fastening section and extending downward past the fastening point. The first and second catching sections are spaced apart from each other in the vehicle transverse direction. A plurality of first vertical reinforcing ribs are located at an outer side of the first catching section that faces away from the electric traction motor and a plurality of second vertical reinforcing ribs are located at an outer side of the second catching section that faces away from the electric traction motor. A first vertical distance between the supporting surface and a lower free end of each of the first and second catching sections is greater than a second vertical distance between the supporting surface and the fastening point.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
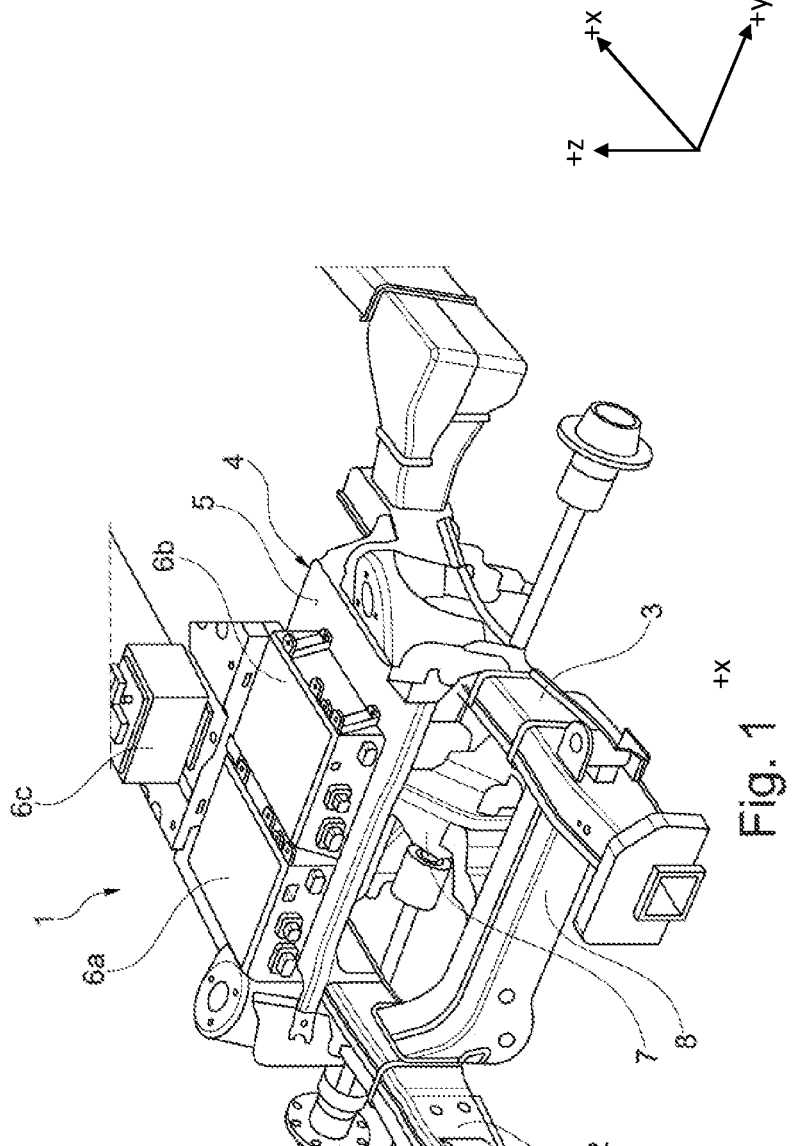
FIG. 1 is a perspective view of a front-end structure according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the different figures, identical parts are always provided with the same designations, for which reason as a rule these are also described only once.

FIG. 1 shows a perspective view of a front-end structure 1 according to the present disclosure for a motor vehicle (not shown) with electric front-wheel drive.

The front-end structure 1 has two longitudinal members 2 and 3 which are arranged to extend in the vehicle longitudinal direction and are arranged at a lateral distance from each other.

Moreover, the front-end structure 1 has a support unit 4 fastened to both longitudinal members 2 and 3 and having a supporting surface 5 for supporting electronic components 6a to 6c of the front-wheel drive.

In addition, the front-end structure 1 has an electric traction motor 7 which, on the front side, is fastened to a front-side crossmember 8 which extends in the vehicle transverse direction and is fastened to both longitudinal members 2 and 3. The electric traction motor 7 has two rear-side fastening sections (not shown) via which the rear side of the electric traction motor 7 is connected to the support unit 4. In one form, the electric traction motor 7 may be connected to the support unit 4 exclusively via the two rear-side fastening sections. The rear-side fastening section can, for example, be formed so as to correspond to one of the forms shown in FIGS. 2 to 6.

The support unit 4 has at least one catching section (not specifically shown) which is arranged offset on the rear side relative to the rear-side fastening section or sections of the electric traction motor 7. A vertical distance between the supporting surface 5 and a lower free end of the catching section is greater than a vertical distance between the supporting surface 5 and a fastening point (not specifically shown), at which the rear-side fastening section is fastened to the support unit 4. The catching section can be formed so as to correspond to one of the forms shown in FIGS. 2 to 6.

The support unit 4 thus serves as a rear-side motor crossmember and as a support element for supporting the electronic components 6a, 6b and 6c. In this way, the motor crossmember and the support element are connected monolithically to each other or integrally formed.

Figures 2, 3:
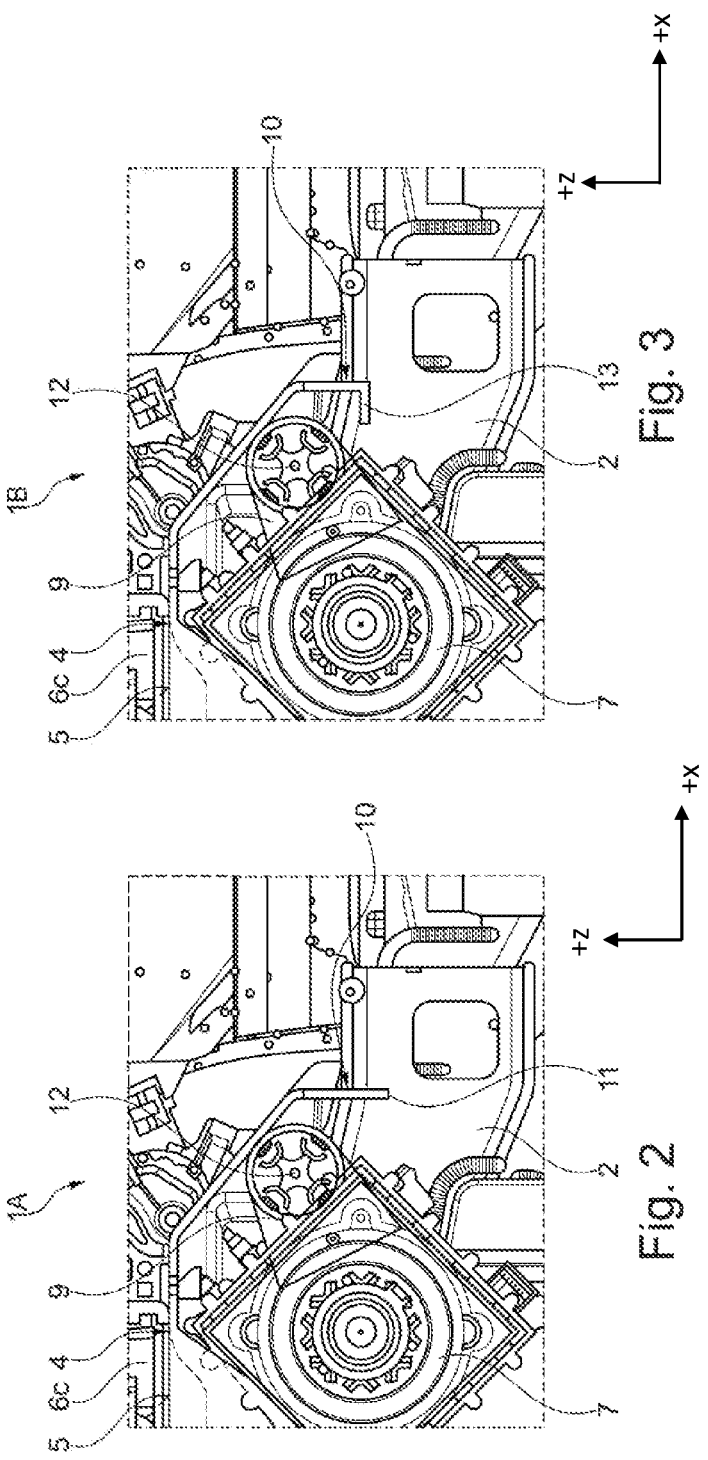
FIG. 2 is a cross-sectional view of another front-end structure according to the present disclosure.
FIG. 3 is a cross-sectional view of yet another front-end structure according to the present disclosure.

FIG. 2 shows a cross-sectional view of another configuration of a front-end structure 1A according to the present disclosure for a motor vehicle (not shown) with electric front-wheel drive.

The front-end structure 1A has two longitudinal members which are arranged to extend in the vehicle longitudinal direction and are arranged at a lateral distance from each other, of which only the left-hand longitudinal member 2 in the drawing plane of FIG. 1 is shown in FIG. 2.

Moreover, the front-end structure 1A has the support unit 4 fastened to both longitudinal members 2 and having a supporting surface 5 for supporting electronic components 6c of the front-wheel drive.

In addition, the front-end structure 1A has the electric traction motor 7, shown in cross section, which at the front is fastened to the front-side crossmember (not shown) extending in the vehicle transverse direction, which is fastened to the two longitudinal members 2, 3. The electric traction motor 7 has two rear-side fastening sections, of which only one fastening section 9 is shown in FIG. 2 and via which the electric traction motor 7 is connected to the support unit 4 on the rear side. In one form, the electric traction motor 7 may be connected to the support unit 4 exclusively via the two rear-side fastening sections.

The support unit 4 has a catching section 10, which is formed as a vertical wall, arranged offset on the rear side relative to the rear-side fastening sections 9 of the electric traction motor 7. A vertical distance between the supporting surface 5 and a lower free end 11 of the catching section 10 is greater than a vertical distance between the supporting surface 5 and a fastening point 12 at which the rear-side fastening sections 9 are fastened to the support unit 4.

Otherwise, the front-end structure 1A can be formed so as to correspond to the configuration shown in FIG. 1. To avoid repetitions, reference is made to the above description relating to FIG. 1.

FIG. 3 shows a cross-sectional view of another configuration of a front-end structure 1B according to the present disclosure for a motor vehicle (not shown) with electric front-wheel drive.

The front-end structure 1B differs from the configuration shown in FIG. 2 in that a lower free end section 13 of the catching section 10 is angled over in the direction of the electric traction motor 7. To avoid repetitions, reference is otherwise made to the above description relating to FIG. 2.

Figure 4:
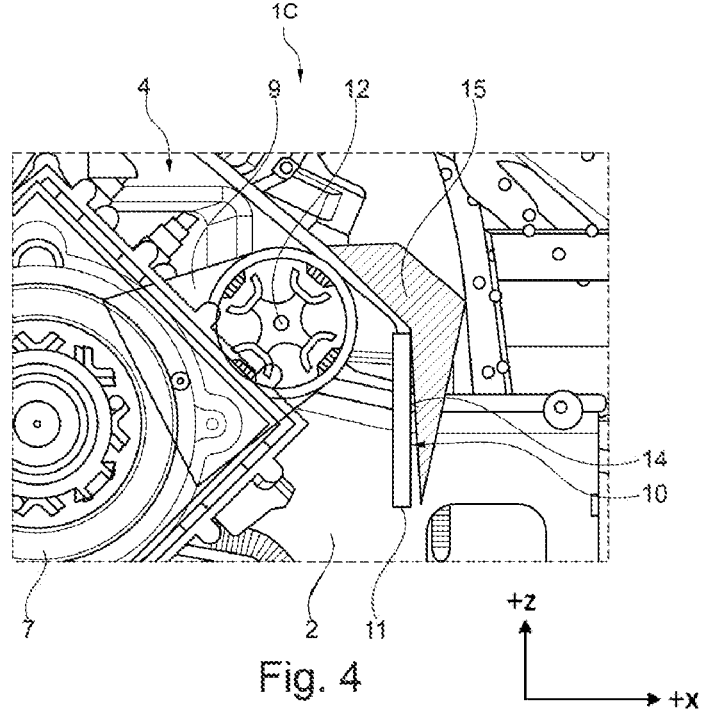
FIG. 4 is a cross-sectional view of another front-end structure according to the present disclosure.

FIG. 4 shows a cross-sectional view of another configuration of a front-end structure 1C according to the present disclosure for a motor vehicle (not shown) with electric front-wheel drive.

The front-end structure 1C differs from the configuration in FIG. 2 in that on an outer side 14 of the catching section 10, facing away from the electric traction motor 7, there are arranged vertical reinforcing ribs 15, of which only one vertical reinforcing rib 15 is shown in FIG. 4. To avoid repetitions, reference is otherwise made to the above description relating to FIG. 2.

Figure 5:
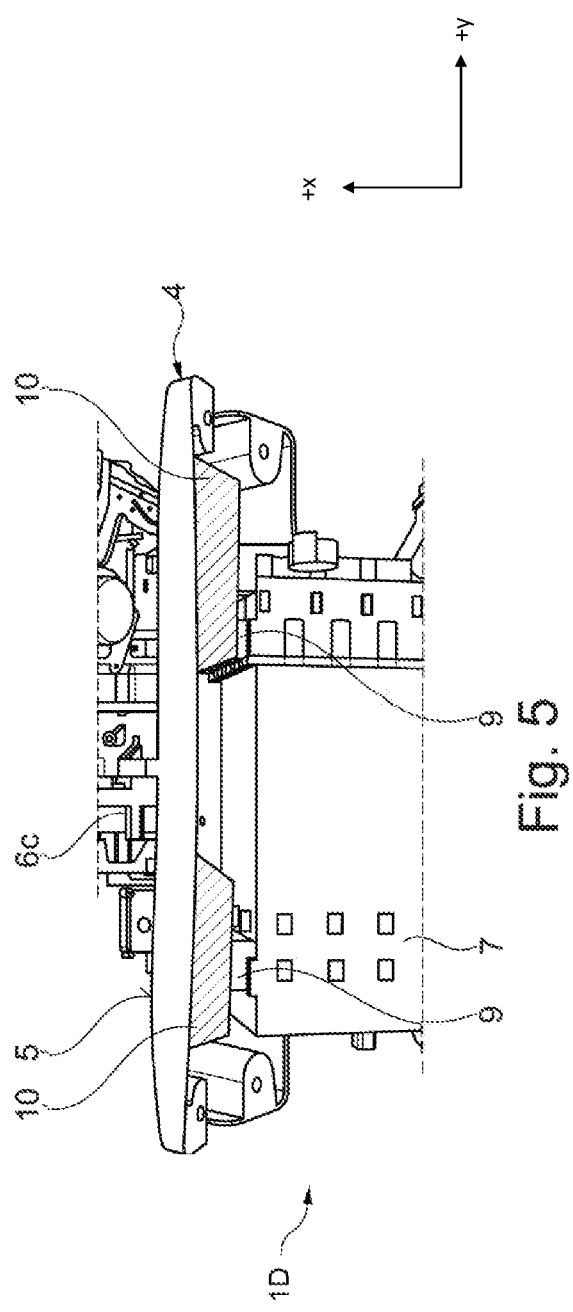
FIG. 5 is a rear view of a front-end structure according to the present disclosure.

FIG. 5 shows a schematic rear view of another configuration of a front-end structure 1D according to the present disclosure for a motor vehicle (not shown) with electric front-wheel drive.

The front-end structure 1D differs from the configuration shown in FIG. 2 in that, for each fastening section 9, a catching section 10 assigned thereto is provided on the support unit 4, wherein a width of the respective catching section 10 provided in the vehicle transverse direction is smaller than a width of the supporting surface 5 provided in the vehicle transverse direction. To avoid repetitions, reference is otherwise made to the above description relating to FIG. 2.

Figure 6:
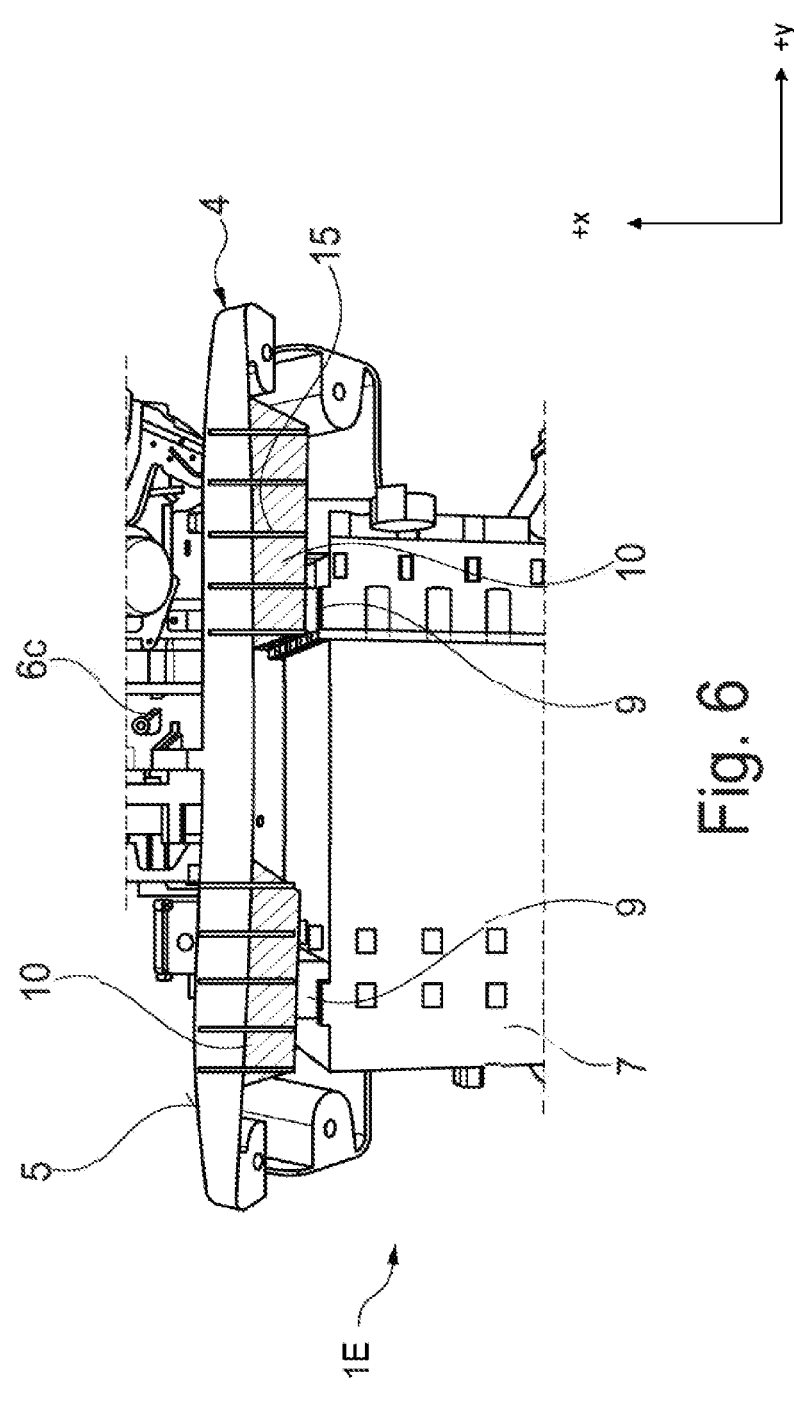
FIG. 6 is a rear view of another front-end structure according to the present disclosure.

FIG. 6 shows a schematic rear view of another configuration of a front-end structure 1E according to the disclosure for a motor vehicle (not shown) with electric front-wheel drive.

The front-end structure 1E differs from the configuration shown in FIG. 5 in that vertical reinforcing ribs 15 are arranged on each catching section 10. To avoid repetitions, reference is otherwise made to the above description relating to FIG. 2.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A front-end structure for a motor vehicle with electric front-wheel drive, the front-end structure comprising:
   at least two longitudinal members extending in a vehicle longitudinal direction and arranged at a lateral distance from each other;
   at least one support unit fastened to the at least two longitudinal members; and
   at least one electric traction motor which, at the front, is fastened to a front-side crossmember that extends in a vehicle transverse direction and is fastened to the at least two longitudinal members, the at least one electric traction motor having at least one rear-side fastening section, via which the at least one electric traction motor is fastened to the at least one support unit at the rear, the at least one rear-side fastening section secured to a rear end of the support unit, wherein the at least one support unit has at least one catching section arranged to be offset relative to the at least one rear-side fastening section.

2. The front-end structure according to claim 1, wherein the at least one support unit is formed by a rear-side crossmember.

3. The front-end structure according to claim 1, wherein the at least one support unit forms a rear-side crossmember and at least one support element which is arranged on the rear-side crossmember and has a supporting surface for supporting at least one electronic component of the front-wheel drive.

4. The front-end structure according to claim 3, wherein a width of the at least one catching section provided in the vehicle transverse direction is smaller than a width of the supporting surface provided in the vehicle transverse direction.

5. The front-end structure according to claim 3, wherein the rear-side crossmember and the at least one support element are connected monolithically to each other.

6. The front-end structure according to claim 1, wherein a lower free end section of the at least one catching section is angled over in a direction of the at least one electric traction motor.

7. The front-end structure according to claim 1, wherein at least one vertical reinforcing rib is arranged on an outer side of the at least one catching section, facing away from the at least one electric traction motor.

8. The front-end structure according to claim 1, wherein at least one horizontal reinforcing rib is arranged on an outer side of the catching section, facing away from the at least one electric traction motor.

9. The front-end structure according to claim 1, wherein the at least one electric traction motor has two rear-side fastening sections arranged at a distance from each other in the vehicle transverse direction, and wherein each rear-side fastening section of the two rear-side fastening sections comprises an individual catching section.

10. A front-end structure for a motor vehicle with electric front-wheel drive, the front-end structure comprising:
   a pair of longitudinal members extending in a vehicle longitudinal direction and arranged at a lateral distance from each other;
   a support unit secured to the pair of longitudinal members and having a supporting surface;
   a front-side crossmember extending in a vehicle transverse direction and secured to the pair of longitudinal members; and
   an electric traction motor secured to the front-side crossmember, the electric traction motor having a first rear-side fastening section secured to a rear end of the support unit at a fastening point,
   wherein the support unit has a first catching section offset in a rearward direction relative to the first rear-side fastening section and extending downward past the fastening point.

11. The front-end structure according to claim 10, wherein a first vertical distance between the supporting surface and a lower free end of the first catching section is greater than a second vertical distance between the supporting surface and the fastening point.

12. The front-end structure according to claim 10, wherein a lower free end of the first catching section is angled over and extends toward the electric traction motor.

13. The front-end structure according to claim 10, wherein the first catching section has a first width extending in the vehicle transverse direction and the supporting surface has a second width extending in the vehicle transverse direction, and wherein the first width is smaller than the second width.

14. The front-end structure according to claim 10, further comprising a plurality of vertical reinforcing ribs located at an outer side of the first catching section that faces away from the electric traction motor, and wherein the vertical reinforcing ribs are spaced apart from each other in the vehicle transverse direction.

15. The front-end structure according to claim 14, wherein the vertical reinforcing ribs are located below the supporting surface.

16. The front-end structure according to claim 10, further comprising at least one first vertical reinforcing rib located on an outer side of the first catching section that faces away from the electric traction motor.

17. The front-end structure according to claim 16, wherein the electric traction motor has a second rear-side fastening section that is spaced apart from the first rear-side fastening section in the vehicle transverse direction.

18. The front-end structure according to claim 17, further comprising a second vertical reinforcing rib located on an outer side of the first catching section that faces away from the electric traction motor.

19. The front-end structure according to claim 17, wherein the at least one first vertical reinforcing rib includes a plurality of vertical reinforcing ribs located at an outer side of the first catching section that faces away from the electric traction motor, and wherein a plurality of second vertical reinforcing ribs are located at an outer side of the second catching section that faces away from the electric traction motor.

20. A front-end structure for a motor vehicle with electric front-wheel drive, the front-end structure comprising:

a pair of longitudinal members extending in a vehicle longitudinal direction and arranged at a lateral distance from each other;

a support unit secured to the pair of longitudinal members and having a supporting surface;

a front-side crossmember extending in a vehicle transverse direction and secured to the pair of longitudinal members; and an electric traction motor secured to the front-side crossmember, the electric traction motor having a rear-side fastening section secured to a rear end of the support unit at a fastening point, wherein the support unit has first and second catching sections offset in a rearward direction relative to the rear-side fastening section and extending downward past the fastening point, the first and second catching sections are spaced apart from each other in the vehicle transverse direction, wherein a plurality of first vertical reinforcing ribs are located at an outer side of the first catching section that faces away from the electric traction motor, wherein a plurality of second vertical reinforcing ribs are located at an outer side of the second catching section that faces away from the electric traction motor, and wherein a first vertical distance between the supporting surface and a lower free end of each of the first and second catching sections is greater than a second vertical distance between the supporting surface and the fastening point.

* * * * *